United States Patent [19]

Palmer

[11] 4,128,283
[45] Dec. 5, 1978

[54] BEARING RETAINING PLATE

[75] Inventor: Clifford A. Palmer, Huddersfield, England

[73] Assignee: Holset Engineering Company Limited, Huddersfield, England

[21] Appl. No.: 744,374

[22] Filed: Nov. 23, 1976

[30] Foreign Application Priority Data

Nov. 25, 1975 [GB] United Kingdom ............... 48323/75

[51] Int. Cl.$^2$ ...................... F16C 33/10; F16C 19/32; F04B 39/02
[52] U.S. Cl. ............................... 308/237 R; 308/163; 308/121; 308/DIG. 11; 308/DIG. 15; 417/407
[58] Field of Search ............... 308/121, 168, DIG. 15, 308/DIG. 11, 237 R, 163, 122, DIG. 4; 415/170 R, 110, 111, 112; 417/407

[56] References Cited

U.S. PATENT DOCUMENTS

| | | | |
|---|---|---|---|
| 2,523,847 | 9/1950 | Russey | 308/163 |
| 3,077,296 | 2/1963 | Ping, Jr. | 308/168 X |
| 3,390,926 | 7/1968 | Woollenweber, Jr. | 308/168 X |
| 3,411,706 | 11/1968 | Woollenweber, Jr. et al. | 308/121 X |

FOREIGN PATENT DOCUMENTS 1006327  9/1965  United Kingdom ..................... 308/163

*Primary Examiner*—Robert B. Reeves
*Assistant Examiner*—Edward M. Wacyra
*Attorney, Agent, or Firm*—Gary M. Gron; Robert T. Ruff

[57] ABSTRACT

The disclosure illustrates a bearing retaining plate for a rotating sleeve bearing of a turbocharger shaft. The plate has a central aperture receiving the shaft and a plurality of circular apertures merging with the central aperture to form restraining fingers having a contact area with the end of the bearing which is no greater than the contact area between its opposite end and another axial restraining device. The plate has integral projections which support a thrust bearing in spaced relationship.

4 Claims, 4 Drawing Figures

BEARING RETAINING PLATE

The present invention relates to pressurized oil lubricated rotatable assemblies and in particular to a bearing retaining plate and to a bearing assembly incorporating such a plate.

In rotatable assemblies in which a shaft is supported for rotation by one or more rotatable sleeve bearings unlimited axial movement of the sleeve bearings must be restrained. Often such movement is limited in one direction by a bearing retaining plate which closely surrounds the shaft at one end of the sleeve bearing and is affixed to the housing. Movement of the bearing in the opposite direction may be limited by a circlip arrangement which allows escape of oil fed under pressure to the sleeve bearing during operation. Oil cannot escape so readily past the bearing retaining plate thereby permitting the oil to exert a pressure against one end of the bearing. The resultant pressure differential between the two ends of the bearing urges it away from the retaining plate. This may result in rapid and uneven wear of the bearing, particularly over its contact area with the circlip arrangement.

According to the present invention there is provided a retaining plate for a rotatable sleeve bearing of a rotatable assembly. The plate comprises a member having an aperture to accommodate the shaft. The area of the plate to be abutted by the bearing is apertured to an extent such that, when in position in a rotatable assembly, the area of contact between the retaining plate and one end of the rotatable sleeve bearing is no greater than, and preferably equals, the area of contact between the opposite end of the sleeve bearing and the member (e.g. a circlip) against which said opposite end bears.

The apertures in the area to be abutted by the bearing, which apertures will allow oil to pass from the bearing to the opposite side of the retaining plate, should be such as to leave enough of the plate to retain the bearing member in place. The apertures may if desired merge into the central shaft aperture so that a single aperture is present, which single aperture, may be of circular or other shape.

In one preferred form of the invention a single aperture is provided in the plate comprising a first circular aperture for the shaft and four equally spaced circular apertures overlapping and thereby merging with the first aperture. The fingers of material extending between the four apertures serve to retain the bearing.

Where the side of the bearing retaining plate opposite to the bearing contacting side is to be placed adjacent other parts (e.g. a thrust plate) of the assembled piece of equipment it is important that the retaining plate should be designed so as to allow oil which in operation will pass therethrough from the bearings to flow freely away. This may be achieved by projections on the opposite face of the retaining plate to the bearing contacting surface in order to space the retaining plate from said other parts thereby leaving a passage for the flow of oil. Such projections preferably are formed integral with the remainder of the plate. The projections may be formed with apertures to accommodate fixing means e.g. screws.

The plate may include an oil passageway or duct for connection at one side with a supply of oil under pressure and at the other side with an area to which oil is to be supplied or a further passageway (e.g. formed in a thrust plate) for receiving such oil and transmitting it to an area (e.g. a thrust bearing) to which oil is to be supplied. The invention also may additionally include a bearing assembly comprising a bearing and a bearing retaining plate in accordance with the invention. The invention also may comprise a rotatable assembly comprising a rotatable shaft supported for rotation by one or more rotatable sleeve bearings, one of said sleeve bearings being retained against axial movement in one direction by a bearing retaining plate of the invention.

The present invention although applicable generally to rotatable assemblies including one or more rotatable sleeve bearings is especially applicable to compressors e.g. turbo-compressors, especially of the exhaust gas driven type.

The present invention may, if desired, be used in conjunction with the invention described and claimed in copending U.S. application Ser. No. 744,373 filed simultaneously herewith.

The invention will now be further described by way of example with reference to accompanying drawings in which.

Figure 1:
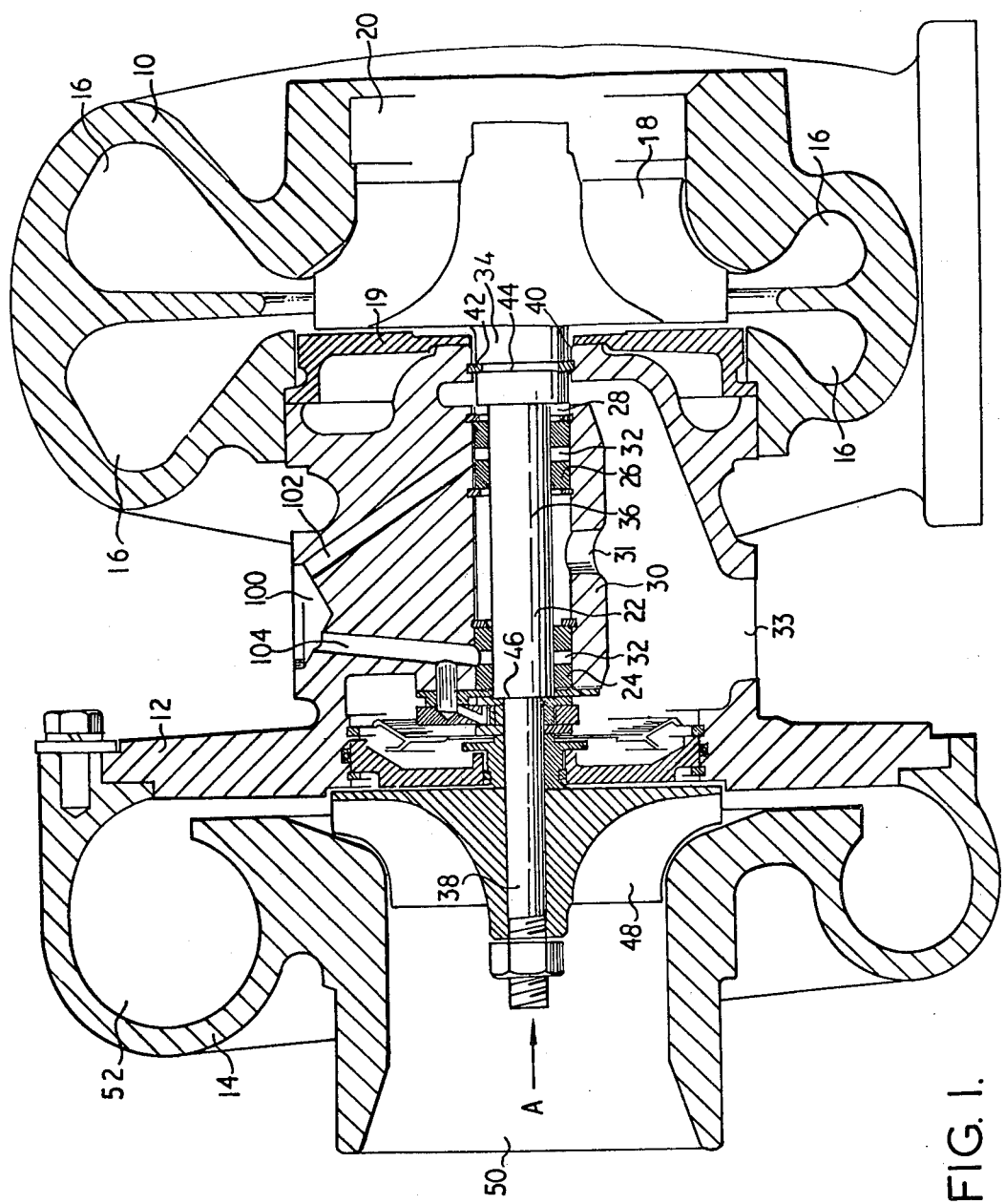
FIG. 1 is a cross section through a turbocompressor having a rotatable assembly incorporating an arrangement in accordance with the invention for retaining a bearing.

Referring now to the drawings (initially FIG. 1), the turbocompressor shown includes a tubine housing 10, a bearing hoursing 12 and a compressor housing 14.

The turbine housing is of conventional construction and includes passageways 16 for receiving gas at a high energy level e.g. exhaust gas from an internal combustion engine, and directing it across a turbine wheel 18 mounted for rotation within the turbine housing 10, and an outlet 20 for spent gases after passage across the turbine wheel 18. An annular back wall 19 for the turbine wheel 18 is sandwiched in position between the turbine housing 10 and the bearing housing 12. The turbine wheel 18 is integral with a shaft 22, which is rotatably mounted within the bearing housing 12 by means of a pair of rotatable sleeve bearings 24, 26. The bearings are mounted in an aperture 28 of circular cross-section formed in a bearing support 30 which is part of the bearing housing 12. Bearing support 30 includes a central oil drain 31 and each of the rotatable sleeve bearings 24, 26 includes a plurality of radial holes 32. A further oil drain 33 is provided in the bearing housing 12.

Figure 1A:
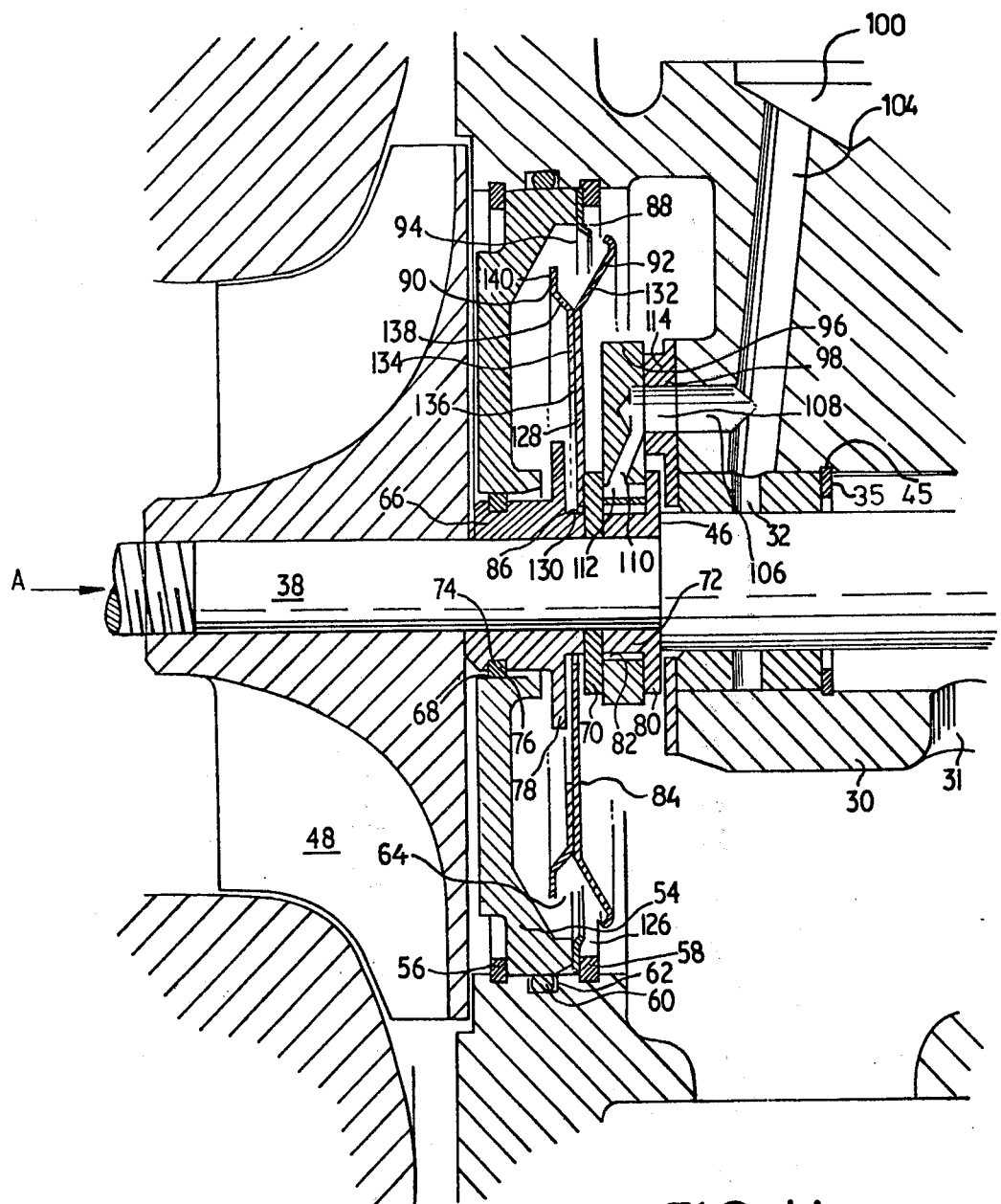
FIG. 1A is an enlarged fragmentary portion of FIG. 1.

The shaft 22 comprises three sections 34, 36, 38 of differing diameters. The portion of largest diameter 34 passes through an aperture 40 formed in the bearing housing 12. A seal is provided by a piston ring 42 located in a groove 44 in the portion 34 of the shaft. The portion of the shaft of intermediate diameter 36 extends through the rotatable sleeve bearings 24, 26 and terminates in a shoulder 46. Attached to the smallest diameter portion 38 of the shaft 22, for rotation therewith is a compressor wheel 48 which is located in the compressor housing 14. The compressor housing is of conventional design and includes an inlet 50 for gas and a passageway 52 of gradually increasing cross sectional area into which gas is directed by the compressor wheel 48. Reference should be made to FIG. 1A. A compressor back plate 54 is provided (which also acts as an end wall to the housing 12) and is held in position at its outer periphery by circlips 56, 58. A rubber O-ring 60 is located in a groove 62 and seats tightly against the outer diameter of the back plate 54.

A cavity 64 is defined between the back plate 54 and the bearing housing 12.

Disposed about the portion 38 of the shaft 22 for rotation therewith and sandwiched between the compressor wheel 48 and the shoulder 46 of the shaft 22 are a first sleeve 66 which extends through an aperture 68 in the backplate 54, an annular ring 70 and a second sleeve 72. The first sleeve 66 has an annular groove 74 therein. A piston ring 76 is disposed in the groove 74 and seats against the edge of the aperture 68. The first sleeve 66 includes a flange 78 disposed between the ends thereof and extending into the cavity 64, which flange acts as a flinger. The second sleeve 72 has a flange 80 disposed against the shoulder 46 and in combination with ring 70 forms an annular channel 82. Flange 80 and ring 70 together act as thrust bearings.

Figure 2:
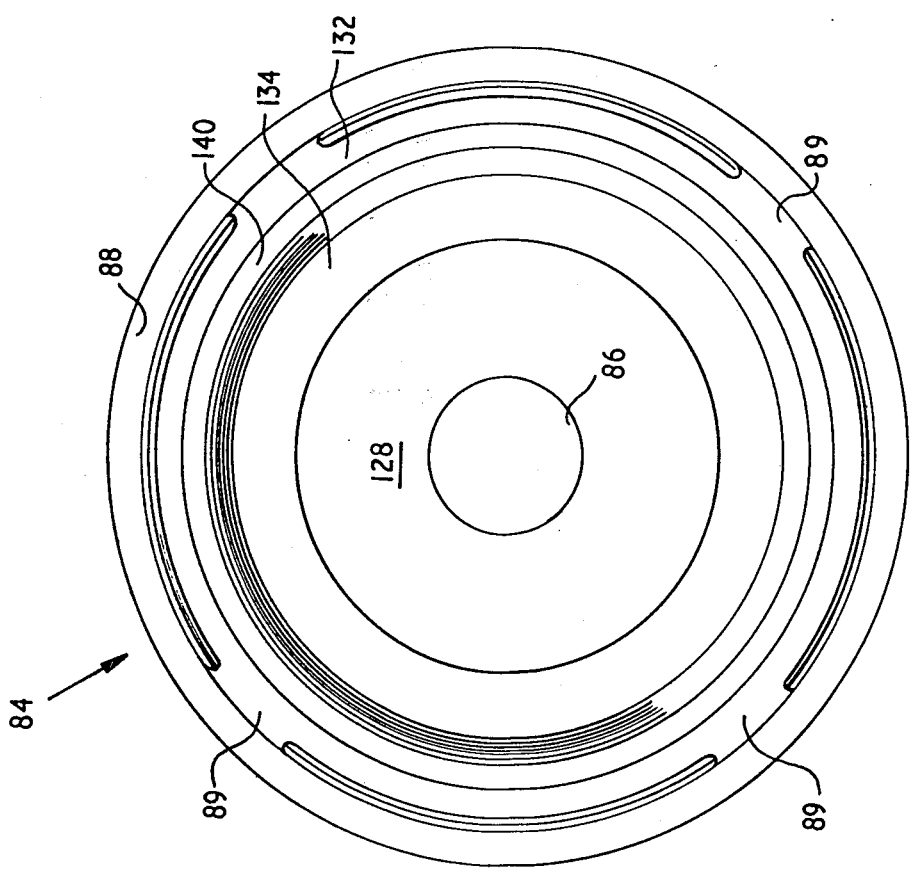
FIG. 2 is a view in the direction of arrow A of one component of the arrangement of FIG. 1.

As shown in FIGS. 1A and 2, an oil deflector assembly 84 comprising first and second dished members 90, 92 attached one to the other in back to back relation is located in the cavity 64 with a large clearance 126 between the periphery of the oil deflector assembly and the inside profile of the cavity.

The first dished member 92 is formed with an annular flange 128 having a central aperture 86. The aperture 86 accepts a diameter 130 of the sleeve 66 with a small clearance. Integral with the annular flange and inclined at an angle from the outer diameter thereof is an annular wall portion 132. The annular flange and the annular wall portion together from a cup like or dished member with the open end of the cup or dish facing the bearing housing 12.

The second dished member 90 is formed with an annular flange 134 having an outside diameter similar to that for to the annular flange 128 and a central aperture 136 which may be of any convenient size. Integral with the annular flange 134 and inclined from the outer edge thereof is an annular wall portion 138. Integral with the annular wall portion and extending radially therefrom is a further annular flange 140. The first and second dished members are attached one to the other in concentric and back to back relation. The inclined annular wall portions thus forming an outwardly facing annular channel 94. The dished members may be attached to each other by rivetting, spot welding or similar means through the annular flanges.

The oil deflector assembly 84 is located and held in position by an outer ring 88, which is sandwiched between the backplate 54 and the circlip 58, and a series of narrow webs 89 extending between the inner diameter of the outer ring 88 and the outer edge of the wall member 132 across the clearance 126. Conveniently the first dished member 92, the outer ring 88 and the webs 89 may be formed as a one piece pressing.

A thrust plate 96 is located in the channel 82 and is maintained in position by a bearing retaining plate and spacer 98 which also serves to retain the rotatable sleeve bearing 24 against axial movement towards the compressor end of the assembly. A circlip 35 located in a groove 45 in the aperture 28 of the bearing support 30 serves to retain the rotatable sleeve bearing against movement towards the turbine end of the assembly.

A recess 100 for connection with a source of oil under pressure (not shown) is formed in the bearing housing 12 and communicates via passageways 102, 104 in the bearing housing 12 with the rotatable sleeve bearings 24, 26 and via passageway 106 in the bearing housing 12, passageway 108 through the bearing retaining plate 98 and passageways 110, 112 in the thrust plate 96 with the thrust bearings formed by the ring 70 and the flange 80.

Figure 3:
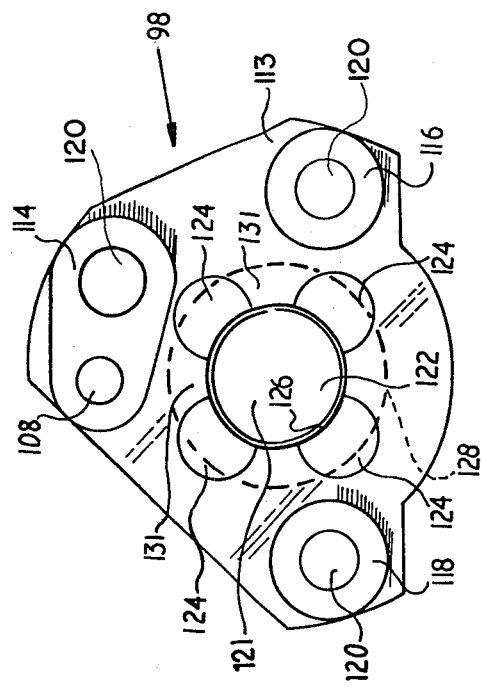
FIG. 3 is an end view also in the direction of arrow A of another component of the arrangement of FIG. 1.

The construction of the bearing retaining plate and spacer 98 may be more clearly seen from a consideration of FIG. 3 in conjunction with FIG. 1A. The bearing retaining plate and spacer 98 is of approximately triangular configuration and includes a plate portion 113 and three integral bosses 114, 116 and 118. The three bosses abut the thrust plate 96 and serve to maintain it in position. They also serve to space the plate portion 113 from the flange 80. Apertures 120 extend through the plate 98 in the raised sections 114, 116 and 118 and allow the passage of three fixing screws (not shown) from the thrust plate 96 to the bearing housing 12. The oil passageway 108 can be clearly seen from FIG. 3 to extend through the raised section 114. Centrally of the plate 98 is an aperture 121 comprising a central circular aperture 122 and four equally spaced apertures 124 each partially overlapping with the aperture 122. The inner and outer diameters of the sleeve bearing 24 are shown in FIG. 3 by the numerals 126 and 128 respectively. The number 126 also corresponds to the position of the shaft and it can be seen that the aperture 121 is designed such that fingers 131 extending between the apertures 124 will serve to retain the bearing 24 in place but that communication is provided from the bearing to the cavity 64 on the opposite side of the plate 98.

The total area of said fingers 131 which are in contact with the rotatable sleeve bearing 24 is not greater than and closely approximates to the area of contact between the rotatable sleeve bearing 24 and the circlip 35.

In operation of the turbocompressor exhaust gases are fed through passageways 16, into the turbine rotor 18 and then through outlet 20. The turbine wheel 18 is thus caused to rotate thereby causing shaft 22 and compressor wheel 48 to rotate.

In operation of the turbocompressor, oil under pressure is fed from recess 100 through passages 102 and 104 to the periphery of the rotatable bearing sleeves 24 and 26 and to the bores of the bearing sleeves via the apertures 32. The pressurized oil is then forced through the clearance spaces between the rotatable sleeve bearings and aperture 28 in the bearing support 30 and through the clearances between the rotatable sleeve bearings and the shaft 22. In the case of the rotatable sleeve bearing 24, oil flowing through the peripheral clearance in the direction of the turbine end of the assembly escapes through the clearance between the circlip 35 and the adjacent end face of the bearing to the central oil drain 31. Oil flowing through the peripheral clearance towards the compressor end of the assembly passes into the clearance between the bearing retaining plate and spacer 98 and the adjacent end face of the bearing before escaping through the aperture 121 to the cavity 64. Any oil pressure build-up within the clearance space between the bearing retaining plate and the bearing which would force the bearing to the right as viewed in FIG. 1, and into contact with the circlip 35 is avoided by the construction of the bearing retaining plate and spacer 98 in which the apertures 124 permit any oil pressure to be relieved into the cavity 64 through the gaps between the raised portions 114, 116 and 118.

During normal operation, rotation of compressor wheel 48 causes air to be drawn in through inlet 50 and compressed into passageway 52 from where it is led to the point at which it is required. Under certain operating conditions where the turbine speed is low it is possible for the engine to aspirate more air than the compressor can provide and under such conditions pressures below atmospheric can exist in the compressor housing and in the area behind the compressor wheel. The pressure in the cavity 64 is normally around atmospheric or slightly above since it leads into the area of the oil drain 33 and a pressure differential may thus exist between the cavity 64 and the compressor side of the back plate 54 which tends to induce a flow of fluid from the cavity to the compressor side of the back plate 54. This flow of fluid would noramlly be in the region closest to the shaft and would cause oil from the bearings to be drawn into the compressor. The presence of the oil deflector 84 in this area closest to the shaft, however, will tend to cause any flow to be around outside of the deflector member rather than along the area closest to the shaft. The area at the outer periphery of the oil deflector will contain primarily air and oil foam rather than liquid oil thus minimizing the flow of oil towards the compressor. Any oil passing around the outer periphery of the oil deflector 84 will tend to be trapped in the channel 94 and will be directed downwardly, out of the channel 84 and through oil drain 33 to the oil sump (not shown). Furthermore any oil which does pass through the central aperature 86 of the oil deflector together with any oil not trapped by the channel 94 will tend to be thrown outwardly away from the route to the compressor by the flinger 78.

It will be appreciated that many modifications of the device shown in the drawings may be effected and that the rotatable assembly of the invention in the form shown or in modified form may be used in machinery other than turbocompressors.

Having thus described the invention what is claimed as novel and desired to be secured by Letters Patent of the United States is:

1. A rotatable assembly comprising:
    a rotatable shaft,
    at least one rotatable fluid lubricated sleeve bearing supporting said shaft for rotation,
    a bearing housing having an end face and a circular aperture receiving said bearing,
    restraining means positioned within said housing circular aperture and adjacent a first end of said bearing for restraining axial movement of said bearing in one direction, said restraining means being in contact over a given area with the first end face of said sleeve bearing,
    a retaining plate fixed on said housing end face adjacent a second end of said bearing for restraining axial movement of said bearing in the opposite direction, said plate having a single aperture comprising a first circular aperture through which said shaft extends and a plurality of apertures extending radially outward from said first aperture to permit passage of fluid from the second end of said bearing and to define a plurality of inwardly projecting fingers, said fingers restraining axial movement of the second end of said bearing, said fingers being in contact with the second end of the bearing over an area which is equal to the contact area of said restraining means with the first end of the bearing.

2. Apparatus as in claim 1 further comprising a thrust bearing for limited axial movement of said shaft relative to said housing and wherein said retaining plate further comprises projections against which said thrust bearing is supported in spaced relation to said plate.

3. Apparatus as in claim 2 wherein said projections are integral with said plate and have apertures aligned with apertures through said thrust bearing for receiving retaining means.

4. Apparatus as in claim 3 wherein said thrust bearing requires a supply of lubricating fluid and wherein one of said projections has a passage aligned with a lubricating fluid supply passage in said thrust bearing.

* * * * *